May 22, 1934.  H. SAUER  1,959,549
POLARIZATION PHOTOMETER
Filed March 23, 1933
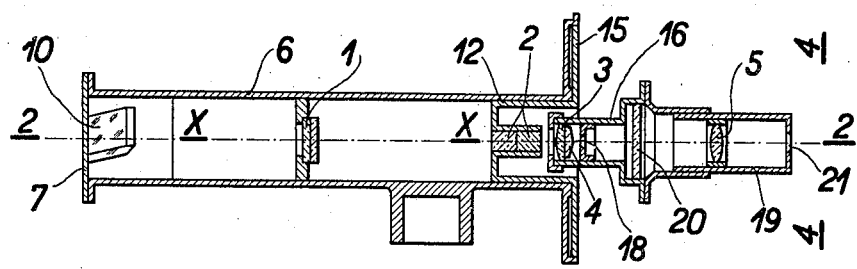
Fig. 1
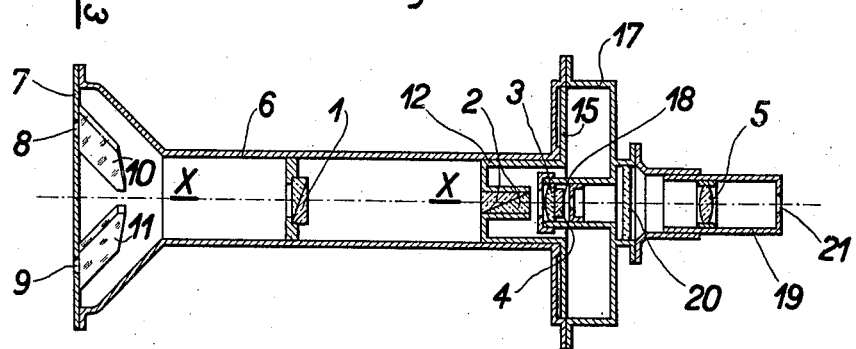
Fig. 2
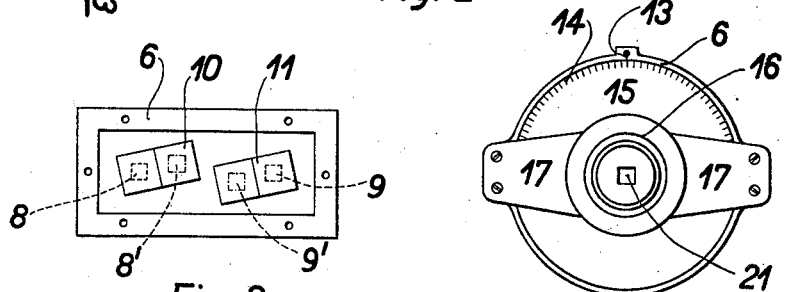
Fig. 3
Fig. 4
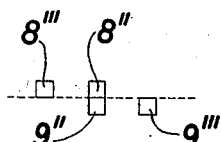
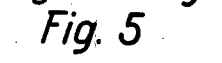
Fig. 5
Inventor:
Hans Sauer Patented May 22, 1934

1,959,549

UNITED STATES PATENT OFFICE 1,959,549

POLARIZATION PHOTOMETER

Hans Sauer, Jena, Germany, assignor to firm Carl Zeiss, Jena, Germany

Application March 23, 1933, Serial No. 662,277
In Germany March 24, 1932

4 Claims. (Cl. 88—23)

The invention concerns a polarization photometer having a polarization prism, an analyzer prism, and a bi-prism.

In the known photometers of this kind, the polarization prism, the bi-prism, and the two light-entrance apertures have such positions relatively to each other that the two prisms deviate the ray pencils emanating from the two light entrance apertures into a plane containing the centres of the light entrance apertures or of images of these apertures. This constructional form is not very advantageous in so far as using light of different wave-lengths entails the necessity of specially adjusting the instrument, which causes those images of the light-entrance apertures to touch each other which are due only to the polarization prism.

According to the invention, this disadvantage is avoided by giving the polarization prism and the bi-prism such positions relatively to each other that the plane in which the one of these prisms deviates the ray pencil is approximately at right angles to the plane of deviation of the other, and by so positioning the light-entrance apertures that they are displaced in opposite directions at right angles to the plane of deviation of the polarization prism. Instead of giving the light-entrance apertures themselves these positions, the said apertures may remain at their usual places when deviating means are so disposed behind them that they appear to assume the said other positions when viewed from the polarization prism. In any case, in order to make the separation line between the fields of view, which is due to the edge of the bi-prism, disappear, the light-entrance apertures are conveniently given such positions that two of their four images due to the polarization prism precisely touch each other, which is actually the case for instance with light-entrance apertures having edges parallel to the plane of deviation of the polarization prism, when corresponding edges lie in a plane parallel to this plane of deviation. This new photometer offers also another advantage in so far as in the plane of the ocular diaphragm the distances between those images of the light entrance apertures which are not used for measuring and the images which are used are of a greater length than that of the corresponding distances in photometers of the known kind.

It is advisable to leave the space between the polarization and the analyzer prism in the known manner free from optical members. This is attained by displacing exactly at 90° the positions in which the one or the other photometric comparison field is just absolutely dark.

To avoid measuring disturbing light effects, the light-entrance apertures, the optical members, and, eventually, diaphragms, may be so positioned that only those two of the ray pencils emanating from the polarization prism enter the succeeding optical members which are used for the comparison measurement. If the analyzer prism is behind the polarization prism, these two prisms are conveniently given such a distance apart and their apertures are so dimensioned that only those images due to the polarization prism enter the analyzer prism which are used for measuring The accompanying drawing represents a constructional example of a polarization photometer according to the invention. Figure 1 is an elevational section and Figure 2, a section at right angles thereto. Figure 3 illustrates a section through line 3—3 in Figure 2, Figure 4 a side view seen from the ocular, and Figure 5 shows the effect of the polarization prism.

The photometer contains the usual optical members, that is to say, a Wollaston prism 1 acting as a polarizer, a Nicol prism 2 acting as an analyzer, an objective 3, a bi-prism 4, and an ocular 5. The Wollaston prism 1 is fixed in the tubular part of a housing 6. In the cover 7 of this tube, two square light-entrance apertures 8 and 9 are so provided that the line connecting their centres intersects the tube axis X—X and is parallel to the plane of deviation of the Wollaston prism 1. Two prisms 10 and 11 fixed to the cover 7 so deviate the ray pencils emanating from the apertures 8 and 9, respectively, that these apertures, when seen from the Wollaston prism 1, appear to assume the positions 8' and 9', indicated in Figure 3 by dash-lines, in which they are displaced relatively to each other at right angles to the plane of deviation of the Wollaston prism 1 in such a manner that the lower edge of 8' and the upper edge of 9' lie in one and the same plane, this plane being parallel to the plane of deviation of the Wollaston prism and containing the centres of 8 and 9. The Nicol prism 2 is mounted in a tubular piece 12 rotatable about the axis X—X in the tubular part of the housing 6. The position which the Nicol prism 2 assumes relatively to the housing 6 is indicated by an index 13, which is disposed on the housing 6, on a graduation 14 provided on a flange 15 connected to the tubular piece 12. The objective 3 and the bi-prism 4 are disposed in a tubular piece 16 screwed to the housing 6 by means of plates 17. The bi-prism 4 has such a position that its edge 18 is parallel to the line connecting the centres of the light-entrance apertures 8 and 9. The ocular 5 is mounted in a tube 19 which is displaceable in the housing 16 in the direction X—X so as to permit focusing. 20 designates a color filter which is mounted in the housing 16, and this conveniently in such a manner that it may be easily exchanged for another. The ocular diaphragm is designated 21.

All parts are arranged in such a manner that two of the four images of the light-entrance apertures which are due to the Wollaston prism 1 touch each other precisely (cf. Figure 5), and that only ray pencils corresponding to these two images enter the Nicol prism 2.

I claim:

1. A polarization photometer having a housing which contains a polarization prism, an analyzer prism and a bi-prism, the analyzer prism being rotatable and the two other prisms being fixed in such a manner that their planes of deviation are approximately at right angles to each other, the housing being provided with two light-entrance apertures adapted to make two systems of light pencils strike the polarization prism, these two systems being displaced relatively to each other at right angles to the plane of deviation of the polarization prism.

2. A polarization photometer having a housing which contains a polarization prism, an analyzer prism, and a bi-prism, the analyzer prism being rotatable and the two other prisms being fixed in such a manner that their planes of deviation are approximately at right angles to each other, the housing being provided with two light-entrance apertures, the line connecting the centres of the two light-entrance apertures being parallel to the plane of deviation of the polarization prism, and two reflecting prisms, each of these prisms being disposed behind one of the two light-entrance apertures and adapted to make two systems of light pencils strike the polarization prism, these two systems being displaced relatively to each other at right angles to the plane of deviation of the polarization prism.

3. A polarization photometer having a housing which contains a polarization prism, an analyzer prism, and a bi-prism, the analyzer prism being rotatable and the two other prisms being fixed in such a manner that their planes of deviation are approximately at right angles to each other, the housing being provided with two square light-entrance apertures adapted to make two systems of light pencils strike the polarization prism, these two systems being displaced relatively to each other at right angles to the plane of deviation of the polarization prism by the height of the light-entrance apertures.

4. A polarization photometer having a housing which contains a polarization prism, an analyzer prism, and a bi-prism, the analyzer prism being rotatable and the other prisms being fixed in such a manner that their planes of deviation are approximately at right angles to each other, the polarization prism and the analyzer prism being separated by an optically free space, the housing being provided with two light-entrance apertures adapted to make two systems of light pencils strike the polarization prism, these two systems being displaced relatively to each other at right angles to the plane of deviation of the polarization prism.

HANS SAUER.